United States Patent Office 2,744,100
Patented May 1, 1956

2,744,100

BROMODEHYDROABIETIC ACID DERIVATIVES

Lee A. Subluskey, Wilmington, Del., assignor to Hercules Powder Company, Wilmington, Del., a corporation of Delaware No Drawing. Application December 13, 1952,
Serial No. 325,891

12 Claims. (Cl. 260—97)

This invention relates to new bromo derivatives of dehydroabietic acid and to the method of preparing them.

The only halogen derivatives of dehydroabietic acid previously described in the art have been those wherein the halogen has been substituted for hydrogen in the aromatic ring of the dehydroabietic acid nucleus or wherein the halogen has replaced the hydroxyl radical of the carboxyl group to form the acyl halide.

Now, in accordance with this invention, it has been found that dehydroabietic acid derivatives containing bromine in the 9- and/or 14-position of the dehydroabietic acid nucleus may be prepared by treating the dehydroabietic acid, or any derivative thereof not already substituted in the 9- and/or 14-position, with an N-bromoimide. Dehydroabietic acid derivatives which may be so brominated are such compounds as dehydroabietic acid itself and esters thereof and dehydroabietyl alcohol and the ethers and esters thereof. Thus, the new bromodehydroabietic acid derivatives in accordance with this invention may be represented by the following structural formula:

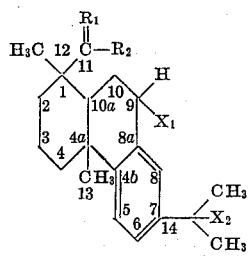

where $R_1$ may be $H_2$ or O and when $R_1$ is $H_2$, $R_2$ may be OH, O-alkyl, O-hydroxyalkyl, O-cycloalkyl, O-aralkyl, or O-acyl, and when $R_1$ is O, $R_2$ may be OH, O-alkyl, O-hydroxyalkyl, O-cycloalkyl, or O-aralkyl; and where $X_1$ may be H, OH, O-acyl, or Br and when $X_1$ is H, OH, or O-acyl, $X_2$ is Br, and when $X_1$ is Br, $X_2$ may be H or Br. These new bromo derivatives are extremely important intermediates for the synthesis of other compounds, and particularly in the synthesis of 9(10)- and 14(15)-dehydro-dehydroabietic acid derivatives.

As pointed out above, any dehydroabietic acid derivative wherein either the 9- or 14-position is unsubstituted may be brominated by means of an N-bromoimide to produce the corresponding 9- and/or 14-bromodehydroabietic acid derivative. If the 9-position is already substituted, as, for example, by a bromo, acyloxy, etc., group, the bromination will occur at the 14-position; that is, hydrogen attached to the middle carbon atom of the isopropyl group at the 7-position of the dehydroabietic acid nucleus will be replaced by bromine. However, if both the 9- and 14-positions are unsubstituted, then the bromination may occur at the 9- and/or 14-position, but, in general, is believed to take place first at the 9-position and subsequently at the 14-position. Hence, when a compound such as methyl dehydroabietate is brominated by the process of this invention, the product which is obtained is usually a mixture of monobromo and dibromo compounds. This bromination reaction is further complicated in that there are two 9-bromodehydroabietates formed. These two 9-bromodehydroabietates are stereoisomers of the type known as epimerides. The one named herein as the 9α-bromide is that wherein the bromine is in trans position with reference to the methyl group attached to the 4a-position of the dehydroabietic acid nucleus, and the other known herein as the 9β-bromide is that wherein the bromine is cis to the 4a-methyl group of the dehydroabietic acid nucleus. When these monobromo derivatives are further brominated to form the dibromo compound, there are accordingly two dibromo derivatives formed, namely, the 9α,14-dibromodehydroabietate and the 9β,14-dibromodehydroabietate. In addition, there is also the monobromo derivative wherein the bromine is in the 14-position. Because of the complexity of the mixture obtained when both the 9- and 14-positions are unsubstituted and the instability of the bromo derivatives, and particularly the instability of the 9β-bromo derivatives, it has not been possible to isolate each of these bromo compounds as a pure, crystalline product. However, their existence in the reaction product has been shown by acetolysis of the reaction product and subsequent deacetylation of the acetoxy compounds.

The following examples will illustrate the bromination of dehydroabietic acid derivatives which are unsubstituted in the 9- and 14-positions and identification of the products derived thereby.

Example 1

A mixture of 22 parts of methyl dehydroabietate, 14 parts of N-bromosuccinimide, and 150 parts of anhydrous carbon tetrachloride was heated to a gentle reflux and exposed to a strong source of ultraviolet light. Within a short period of time, the reaction mixture began to boil rapidly and the evolution of hydrogen bromide was detected. It was then quickly filtered to remove the insoluble succinimide and the filtrate was evaporated to dryness under reduced pressure at room temperature. The residue so obtained was recrystallized from isooctane. The crystalline material so obtained had a melting point of 126.5°–127° C. and was not altered on further recrystallization. It had a specific rotation of $[\alpha]_D^{26°} -57.8°$ in chloroform. On analysis this crystalline product was found to contain 62.20% carbon, 7.23% hydrogen, and 22.9% bromine, which indicates that the crystalline product contains 82.5% monobromide and 17.5% dibromide.

Example 2

A mixture of 20 parts of methyl dehydroabietate, 12 parts of N-bromosuccinimide, and 0.005 part of benzoyl peroxide in 100 parts of anhydrous carbon tetrachloride was refluxed for 1 hour. Considerable amounts of hydrogen bromide were evolved toward the end of this period. The insoluble succinimide was removed by filtration and the filtrate was then evaporated under reduced pressure, whereby 28.2 parts of the brominated methyl dehydroabietate was obtained.

The structure of the bromides present in the above bromination products was determined by the following experiments:

Four parts of the crystalline bromide obtained by the procedure of Example 1 was mixed with 1.5 parts of fused potassium acetate and 200 parts of glacial acetic acid and the mixture was heated at 80° C. for 6 hours, after which the major portion of the acetic acid was distilled off under reduced pressure. The residual solution was then diluted with water, neutralized with sodium bicarbonate, and extracted three times with ether. The combined ether extracts were dried with sodium sulfate and evaporated to dryness, whereupon the residue crystallized. Recrystallization of this material first from methanol and then from isooctane gave two crops of crystals of methyl 9α-acetoxydehydroabietate. The latter was purified by chromatography on alumina and recrystallization from methanol, whereby a product was obtained having a melting point of 168–168.5° C. with a specific rotation in chloroform of $[\alpha]_D^{25°} +30.8$. Its carbon and hydrogen analyses agreed with those of methyl 9α-acetoxydehydroabietate. That this product was the 9α-acetoxy compound was proved by refluxing it in collidine, whereupon no reaction took place. Had it been the 9β-acetoxy compound, the collidine treatment would have formed a double bond in the 9(10)-position. The 9α-acetoxydehydroabietate could only have been formed from the 9β-bromo configuration, and its formation is definite proof that the bromination product contained methyl 9β-bromodehydroabietate.

A crude bromination product obtained by the procedure of Example 2 was mixed with 12 parts of fused potassium acetate and 200 parts of glacial acetic acid and heated at 80° C. for 4 hours. The reaction mixture was then allowed to stand at room temperature for about 60 hours, after which it was poured into water and the aqueous mixture then was neutralized with sodium bicarbonate and extracted three times with ether. The combined ethereal extracts were dried with sodium sulfate and then evaporated to dryness. The residue so obtained was crystallized from methanol, whereby 3.0 parts of crystals of methyl 9α-acetoxydehydroabietate was obtained, again proving the presence of methyl 9β-bromodehydroabietate in the bromination product.

The mother liquors from this crystallization were evaporated to dryness and the residue was dissolved in hexane and placed on an alumina column. Continued elution of the column with hexane yielded 9.03 parts of an oil. That this oil was a mixture of methyl 9(10)-dehydro-dehydroabietate and methyl 14(15)-dehydro-dehydroabietate was shown by the fact that it readily absorbed bromine in carbon tetrachloride solution, absorbed hydrogen over palladium in the amount of 66 mg. of hydrogen per g. (theoretical for one double bond is 64 mg. of hydrogen per g.) and exhibited an ultraviolet spectrum characteristic of 9(10)- and 14(15)-unsaturation. This may be taken as proof that the original bromination product contained both methyl 9α-bromodehydroabietate and methyl 14-bromodehydroabietate. Further proof of their presence is given in Example 3 below.

Continued elution of the column with benzene and mixtures of benzene and methylene chloride yielded 6.5 parts of a crystalline material which on analysis was proved to be a mixture of methyl 9α-acetoxydehydroabietate and methyl 9α-hydroxydehydroabietate, both of which were, of course, formed from the methyl 9β-bromodehydroabietate present in the bromination product.

The presence of a dibromide in the bromination product was shown by ozonization of the crude acetolysis product, prepared as described above by heating the bromination product with fused potassium acetate and glacial acetic acid. This ozonization product gave a positive iodoform reaction indicating the presence of a methyl ketone, which could only be present if bromination had taken place at the 14-position with subsequent dehydrobromination by means of the potassium acetate treatment and then ozonization according to the following reactions:

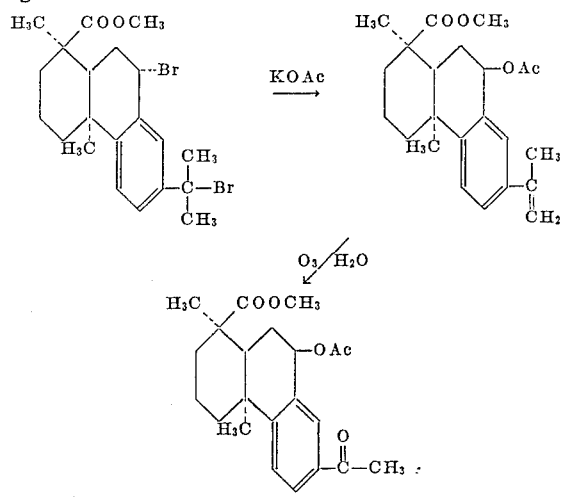

That the 7-isopropenyl and 7-acetyl compounds had the structures set forth above, containing the acetoxy group in the 9α-position was proved by synthesizing them by another process as described in Example 4 below. Since the compound containing an acetoxy group in the 9α-position and acetyl group in the 7-position was obtained from the bromination product obtained on bromination of methyl dehydroabietate, then methyl 9β,14-dibromodehydroabietate must have been present in the original bromination product.

Further proof that both methyl 9α-bromodehydroabietate and methyl 9β-bromodehydroabietate are present in the bromination product is found in the following example.

*Example 3*

Fifty parts of methyl dehydroabietate and 30 parts of N-bromosuccinimide were mixed with 500 parts of carbon tetrachloride which had previously been cooled to 15° C. The reaction mixture was agitated while bubbling a stream of dry nitrogen through it and exposed to ultraviolet light. These conditions were maintained for one hour, during which time the temperature of the reaction mixture was not allowed to rise above 25° C. At the end of this time, the insoluble succinimide was removed by filtration.

The solution of the bromination product in carbon tetrachloride, which was the filtrate obtained above, was then poured into a solution of 50 parts of fused potassium acetate in 750 parts of glacial acetic acid. This acetolysis mixture was agitated under reduced pressure and heated at 80° C. until the carbon tetrachloride and acetic acid solvents had been removed by evaporation. The residue so obtained was dissolved in 700 parts of ether and the ethereal solution was washed with water, then with a saturated sodium carbonate solution, and finally with water again, and dried. On removal of the ether, there was obtained 51.2 parts of a crystalline solid. The ultraviolet absorption of this solid indicated the presence of a double bond in the 14(15)-position. The presence of this 14(15)-unsaturation indicates that the bromination product contained one or all three of the following bromo compounds, namely, methyl 14-bromodehydroabietate, methyl 9α,14-dibromodehydroabietate, and methyl 9β,14-dibromodehydroabietate, since only a bromine in the 14-position could yield this 14(15)-unsaturation. Recrystallization of this solid from hexane reduced the 14(15)-unsaturation but did not completely remove it. A portion of this recrystallized material was then hydrogenated in ethyl acetate with a palladium-on-carbon catalyst whereby all of the 14(15)-unsaturation was removed. The product so obtained had a melting point of 154°–161° C. and was a mixture of methyl 9α-acetoxydehydroabietate and methyl 9β-acetoxydehydroabietate.

That the above product was a mixture of the 9α- and 9β-acetoxy derivatives was shown by refluxing a portion of the mixture in collidine for 40 hours, after which the reaction mixture was dissolved in ether, washed with dilute hydrochloric acid, dried, and evaporated to dryness. Crystallization of this product yielded a pure methyl 9α-acetoxydehydroabietate having a melting point of 167°–168° C. Evaporation of the mother liquors from this crystallization gave an oil which exhibited the characteristic ultraviolet absorption of 9(10)-unsaturation. Inasmuch as the 9α-acetoxy compound is stable toward collidine, whereas the 9β-acetoxy compound is not (being deacetylated to yield a 9(10)-double bond), the above acetoxy product melting at 154°–161° C. must be a mixture of methyl 9α-acetoxydehydroabietate and methyl 9β-acetoxydehydroabietate. Therefore, the original bromination product must have contained both the methyl 9α-bromodehydroabietate and the methyl 9β-bromodehydroabietate.

The following example will illustrate the bromination of a dehydroabietic acid derivative wherein the 9-position is already substituted and the isolation of the 14-bromo compound so obtained.

Example 4

Two parts of methyl 9α-acetoxydehydroabietate having a melting point of 167°–168° C. was brominated with 1.0 part of N-bromosuccinimide in 50 parts of carbon tetrachloride under the same reaction conditions employed in Example 3 except that the reaction time was limited to 20 minutes. After removal of the succinimide by filtration, the carbon tetrachloride solvent was removed by distillation under reduced pressure. The crystalline residue of methyl 9α-acetoxy-14-bromodehydroabietate so obtained had a melting point of 130.5°–131.5° C.

One part of the above product was mixed with 0.5 part of fused potassium acetate in 25 parts of glacial acetic acid and heated on a steam bath for 2 hours. At the end of this time, the reaction mixture was diluted with 100 parts of water, neutralized with sodium bicarbonate, and then was extracted with ether. The ethereal extract was washed with water and dried with sodium sulfate. On removal of the ether, there was obtained an oil which on crystallization from methanol yielded a product having a melting point of 118°–119° C. and showing unsaturation at the 14(15)-position by ultraviolet absorption. Thus, this product was shown to be methyl 9α-acetoxy - 14(15) - dehydrodehydroabietate (the systematic name is the methyl ester of 9α-acetoxy-1,2,3,4,4a,9,10,10a - octahydro - 7-isopropenyl-1,4a-dimethyl-1-phenanthrenecarboxylic acid), which product could only be obtained if the above bromination had taken place on the 14-carbon atom.

The following examples will illustrate the bromination of dehydroabietyl alcohol derivatives which are unsubstituted in the 9- and/or 14-positions and the identification of the products derived thereby.

Example 5

An agitated mixture of 75 parts of dehydroabietyl p-chlorobenzoate, 40 parts of N-bromosuccinimide, 4000 parts of carbon tetrachloride, a trace of p-cymyl cumyl peroxide, and a trace of di-tert-butyl peroxide was cooled to —6° C. and exposed to ultraviolet light for 2 hours. At the end of this time, bromination was complete and the insoluble succinimide was removed from the reaction mixture by filtration.

That bromination took place at both the 9- and 14-positions was demonstrated by acetolysis of the bromo product. To the carbon tetrachloride solution of the above bromo product was added 200 parts of potassium acetate and 300 parts of acetic acid. This reaction mixture was agitated at 20°–25° C. under reduced pressure evaporating conditions for 3 days, 200 parts of acetic acid being added twice during this period. The concentrated reaction mixture was then added to 2000 parts of water, whereupon the acetolysis product precipitated and was separated by filtration. This acetolysis product amounted to 96 parts and had a saponification number of 238. It was a mixture of 9α- and 9β-acetoxydehydroabietyl p-chlorobenzoate, 9α- and 9β-acetoxy-14(15)-dehydro-dehydroabietyl p-chlorobenzoate, and 9(10)-dehydrodehydroabietyl p-chlorobenzoate, the latter three products having been produced by dehydrobromination at the 14(15)- or 9(10)-positions during the acetolysis reaction. Thus the bromination product contained 9α- and 9β-bromodehydroabietyl p-chlorobenzoate and 9α,14- and 9β,14-dibromodehydroabietyl p-chlorobenzoate.

Example 6

A mixture of 25 parts of methyl 9-oxodehydroabietate and 50 parts of ether was added to an agitated mixture of 7 parts of lithium aluminum hydride and 200 parts of ether. Agitation of the reaction mixture was continued for 24 hours at a temperature of 20°–25° C. The excess lithium aluminum hydride was then destroyed by the addition of 200 parts of water, after which 100 parts of an aqueous 20% sulfuric acid solution was added and the agitation was continued for 4 hours. The ether phase was then separated, washed with water, then with a saturated sodium bicarbonate solution, again with water, and finally was dried. Evaporation of the ether yielded a white, crystalline solid. On recrystallization from methanol, the 9β-hydroxydehydroabietyl alcohol had a melting point of 156.5°–157.5° C.

Seventeen parts of the above diol was dissolved in 100 parts of pyridine and then 20 parts of benzoyl chloride was added. The reaction mixture was then heated on a steam bath for 1 hour, at the end of which time 300 parts of water was added and the resulting mixture was extracted with ether. The ether extract was washed with a 10% aqueous hydrochloric acid solution, then with a saturated sodium bicarbonate solution and water, and finally was dried over sodium sulfate and evaporated. The oil so obtained was crystallized from ethanol to yield 22.7 parts (79% of theory) of the product, melting at 128°–129° C. Several recrystallizations from ethanol raised this melting point to 129.5°–130.5° C. On analysis the cabon and hydrogen were found to agree with the theoretical values for 9α-benzoxydehydroabietyl benzoate.

Ten parts of the above dibenzoate was dissolved in a mixture of 2250 parts of carbon tetrachloride and 3.6 parts of N-bromosuccinimide. A stream of nitrogen was bubbled through the reaction mixture and, with the temperature held at 0° to —5° C., it was subjected to ultraviolet irradiation. After about 2 hours the bromination was completed and the reaction mixture was filtered to remove the succinimide. The carbon tetrachloride was removed from the filtrate under reduced pressure. The 9β-benzoxy-14-bromodehydroabietyl benzoate which remained as the residue was a viscous oil.

That the bromine was in the 14-position was shown by dehydrobromination and hydrolysis of the above product. A portion of it dissolved in acetone was treated with sodium carbonate and sodium iodide. After refluxing for 1 hour, the reaction mixture was diluted with water and extracted with ether. On removal of the ether from the ethereal extract, there was obtained a white solid which on recrystallization from hexane had a melting point of 110°–111° C. On hydrolysis of the 9β-benzoxy-14(15)-dehydro-dehydroabietyl benzoate, so obtained, with a solution of sodium hydroxide in ethanol, there was obtained a crystalline product identified as 9β-hydroxy-14(15)-dehydro - dehydroabietyl alcohol, melting point 152°–152.5° C.

While the foregoing examples have shown the bromination of the methyl ester of dehydroabietic acid to produce the 9- and 14-bromo derivatives, the corresponding 9- and 14-bromo derivatives of dehydroabietic acid or any ester thereof may be prepared by the same process; that is, any ester, as, for example, the methyl, ethyl, propyl, butyl, hydroxyethyl, glycerol, cyclohexyl, benzyl, etc., dehydroabietates may be brominated in accordance with this invention with an N-bromoimide to produce a 9- and/or 14-bromo derivative thereof. In the same way, any ester of a 9-substituted dehydroabietic acid may be brominated to produce the corresponding 14-bromide. For example, the 9-substituted dehydroabietic acid may be one containing an acyloxy group such as an acetoxy, benzoxy, etc., group in the 9-position, as shown in Example 4, or some other substituent, as, for example, a methyl or other ester of 9-oxodehydroabietic acid, 9 - hydroxydehydroabietic acid, 9 - bromodehydroabietic acid, etc.

The above examples have also demonstrated the bromination of such dehydroabietic acid derivatives as dehydroabietyl alcohol esters. In the same way, dehydroabietyl alcohol or any other dehydroabietyl alcohol derivative such as an ester or ether or dehydroabietyl alcohol may be brominated, as, for example, methyl dehydroabietyl ether, ethyl dehydroabietyl ether, phenyl dehydroabietyl ether, benzyl dehydroabietyl ether, cyclohexyl dehydroabietyl ether, etc., or dehydroabietyl acetate, dehydroabietyl benzoate, etc. The dehydroabietyl alcohol, ether, or ester thereof may also be substituted in the 9-position by such groups as an acyloxy group such as acetoxy, benzoxy, etc., a keto group, hydroxy group, bromo group, etc., in which case the bromination will then take place at the 14-position.

The bromination reaction in accordance with this invention may be carried out by contacting the dehydroabietic acid or derivative thereof with an N-bromoimide. Exemplary of the N-bromoimides which may be used are N-bromoacetamide, N-bromosuccinimide, N-bromophthalimide, etc. Since these N-bromoimides will react with water to form hypobromous acid, the reaction should be carried out under substantially anhydrous conditions to avoid waste of the brominating agent by such a side reaction. The amount of N-bromoimide used for the bromination reaction will depend upon the degree of bromination desired. Theoretically, one mole per mole of starting material is required per atom of bromine introduced into the molecule, but, in general, an amount of from about 0.25 mole to about 2.5 moles per mole of the material being brominated is used. Higher amounts of the N-bromoimide may be used but are not believed to serve any useful purpose since the maximum amount of bromine introduced into these products is two atoms per molecule.

The maximum temperature at which this reaction should be carried out is, of course, governed by the stability of the bromo compound which is being prepared. For example, some of the alkyl 9-bromodehydroabietates are not stable at temperatures much above room temperature, dehydrobrominating at elevated temperatures, and hence the reaction is preferably carried out at lower temperatures. On the other hand, such compounds as methyl 9α-acetoxy-14-bromodehydroabietate are stable at their melting point and hence the reaction may be carried out at any temperature below their melting point. In general, the reaction is carried out at a temperature of from about −20° C. to about 80° C., preferably at a temperature of from about −15° C. to about 25° C., and more preferably at a temperature of from about −10° C. to about 5° C.

While it is possible to carry out the reaction in the absence of a free radical initiator, the reaction will take place more readily when such an initiator is used. Any free radical initiator which will liberate free radicals under the temperature conditions used may be used in this reaction, as, for example, ultraviolet light, acetyl peroxide, di-tert-butyl peroxide, benzoyl peroxide, or any other organic peroxide, etc. The reaction is conveniently carried out in solution in an inert organic solvent. Any organic liquid which is inert under the conditions of the reaction may be used; as, for example, hydrocarbons such as benzene, hexane, heptane, or mixtures of aliphatic hydrocarbons such as petroleum ether, etc., or chlorinated hydrocarbons such as chloroform, carbon tetrachloride, etc., may be used.

The new bromo compounds of this invention are useful as intermediates in the synthesis of other products, particularly in the synthesis of intermediates for the preparation of pharmaceuticals. As may be seen from the foregoing discussion, it is possible to introduce a double bond in the 9(10)-position or 14(15)-position of the dehydroabietic acid or dehydroabietyl alcohol nucleus by acetolysis and subsequent deacetylation of these bromo compounds, which double bonds, in turn, provide reactive centers for the preparation of many other compounds. Thus, it is possible to prepare the esters of 9(10)-dehydro-dehydroabietic acid from the esters of 9-bromodehydroabietic acid and 9(10)-dehydro-dehydroabietyl alcohol or ester or ethers thereof from the corresponding 9 - bromodehydroabietyl alcohol. These dehydro-dehydroabietic esters or alcohols may be used as plasticizers for cellulose ethers and esters, etc., or in adhesive compositions. The isopropyl group attached to the aromatic ring of the dehydroabietic or dehydroabietyl nucleus may be converted to an isopropenyl group which can, in turn, be cleaved to an acetyl group by means of the 14-bromo compounds produced in accordance with this invention. Many other uses for the bromo compounds of this invention will, of course, be apparent to one skilled in the art.

What I claim and desire to protect by Letters Patent is:

1. As a new composition of matter, a compound having the formula

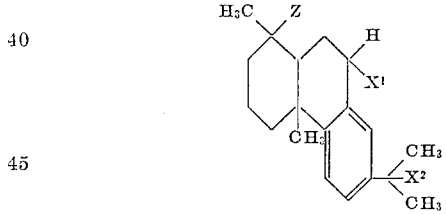

where Z is selected from the group consisting of methylol, acyloxymethyl, carboxy, and carboalkoxy and $X^1$ is selected from the group consisting of H, OH, O-acyl, and Br and $X^2$ is selected from the group consisting of H and Br, where at least one of $X^1$ and $X^2$ is Br and acyl in each instance is the acyl radical of a carboxylic acid.

2. An alkyl ester of 9-bromodehydroabietic acid.

3. An alkyl ester of 9,14-dibromodehydroabietic acid.

4. An alkyl ester of a 9-acyloxy-14-bromodehydroabietic acid where acyl is the acyl radical of a carboxylic acid.

5. A carboxylic acid ester of 9-bromodehydroabietyl alcohol.

6. A carboxylic acid ester of a 9-acyloxy-14-bromodehydroabietyl alcohol where acyl is the acyl radical of a carboxylic acid.

7. The process which comprises contacting a compound of the formula

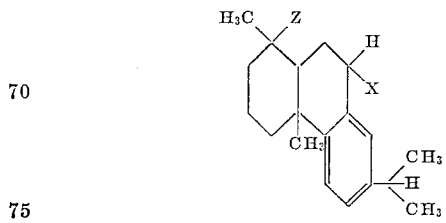

where Z is selected from the group consisting of methylol, acyloxymethyl, carboxy, and carboalkoxy and X is selected from the group consisting of H, OH, O-acyl and Br, with an N-bromoimide under substantially anhydrous conditions at a temperature of from about −20° C. to about 80° C., where acyl in each instance is the acyl radical of a carboxylic acid.

8. The process of preparing an alkyl ester of 9-bromodehydroabietic acid which comprises contacting an alkyl ester of dehydroabietic acid with an N-bromoimide under substantially anhydrous conditions at a temperature of from about −20° C. to about 80° C. in the presence of a free radical initiator selected from the group consisting of ultraviolet light and organic peroxides.

9. The process of preparing an alkyl ester of 9,14-dibromodehydroabietic acid which comprises contacting an alkyl ester of dehydroabietic acid with an N-bromoimide under substantially anhydrous conditions at a temperature of from about −20° C. to about 80° C. in the presence of a free radical initiator selected from the group consisting of ultraviolet light and organic peroxides.

10. The process of preparing an alkyl ester of a 9-acyloxy-14-bromodehydroabietic acid which comprises contacting an alkyl ester of 9-acyloxydehydroabietic acid with an N-bromoimide under substantially anhydrous conditions at a temperature of from about −20° C. to about 80° C. in the presence of a free radical initiator selected from the group consisting of ultraviolet light and organic peroxides and where in each instance acyl is the acyl radical of a carboxylic acid.

11. The process of preparing a carboxylic acid ester of 9-bromodehydroabietyl alcohol which comprises contacting a carboxylic acid ester of dehydroabietyl alcohol with an N-bromoimide under substantially anhydrous conditions at a temperature of from about −20° C. to about 80° C. in the presence of a free radical initiator selected from the group consisting of ultraviolet light and organic peroxides.

12. The process of preparing a carboxylic acid ester of a 9-acyloxy-14-bromodehydroabietyl alcohol which comprises contacting a carboxylic acid ester of a 9-acyloxydehydroabietyl alcohol with an N-bromoimide under substantially anhydrous conditions at a temperature of from about −20° C. to about 80° C. in the presence of a free radical initiator selected from the group consisting of ultraviolet light and organic peroxides and where in each instance acyl is the acyl radical of a carboxylic acid.

References Cited in the file of this patent

UNITED STATES PATENTS 2,367,002    Campbell _____ Jan. 9, 1945

OTHER REFERENCES

Chemical Reviews 73, pp. 273, 287 and 288.